(No Model.)
C. L. E. LUGENBUEHL.
PIANO ATTACHMENT.
No. 449,048. Patented Mar. 24, 1891.
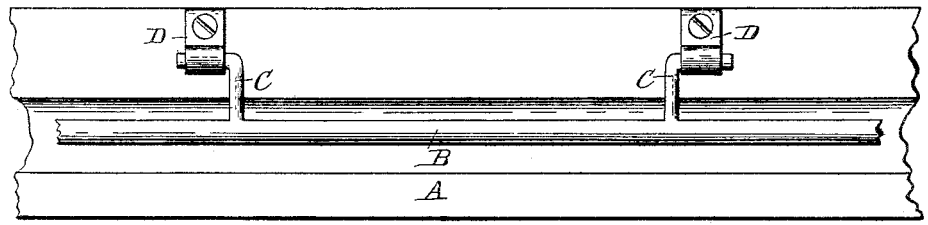
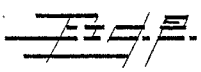
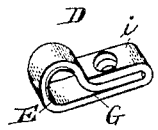
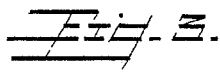
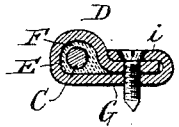
Witnesses
Jos H Blackwood
Albert B. Blackwood
Inventor
Charles L. E. Lugenbuehl
by M H Doolittle
Attorney the bushing is glued into the # UNITED STATES PATENT OFFICE.

CHARLES L. E. LUGENBUEHL, OF NEW YORK, N. Y.

PIANO ATTACHMENT.

SPECIFICATION forming part of Letters Patent No. 449,048, dated March 24, 1891.

Application filed December 13, 1890. Serial No. 374,594. (No model.)

*To all whom it may concern:*

Be it known that I, CHARLES L. E. LUGENBUEHL, a citizen of the Republic of Switzerland, residing at New York city, in the county of New York and State of New York, have invented certain new and useful Improvements in Piano Attachments; and I do hereby declare the following to be a full, clear, and exact description of the invention, such as will enable others skilled in the art to which it appertains to make and use the same.

My invention relates to an attachment for pianos; and it consists of a novel form of bearing for rods, cranks, pins, or pivots used in pianos, but more especially of a bearing for a damper-rod, crank, or lifting-bar at the point of connection with the main action-frame. Hitherto, so far as I am aware, such bearings have generally consisted of a cast flange having a smooth round socket, which socket is filled with a felt or cloth bushing to receive the end of a crank or pivot. The difficulties experienced from such flanges are that the bushing which is glued into the round socket soon becomes worn loose and detached from the round smooth socket in which it has been placed, leaving the rod or pivot in direct contact with the metal surface, and which results in producing a grating noise often heard in pianos and necessitating at great annoyance and expense constant repairs. Again, these cast flanges are brittle and often break or crack, which of course necessitates their removal. To overcome these difficulties I have constructed a flange out of malleable sheet-brass, steel, sheet-zinc, or other suitable metal by bending it into a certain shape by a proper machine, whereby the same is made elastic, and thus yields better to pressure and blows, and by providing the socket with a recess or groove running through it lengthwise, whereby a confining-seat is formed for the glue and a portion of the felt, which holds the bushing in place.

My invention is illustrated in the accompanying drawings, in which—

Figure 1 is a view in elevation showing a damper-rod of a piano in connection with frame and with the bearing containing my invention in position; Figs. 2 and 3, details in perspective and cross-section of my improved bearing.

Referring to the drawings, A is a main action-frame, and connected therewith is a damper-rod B, having the crank-arms C.

D is the bearing, and E the socket in said bearing containing the bushing F.

G is a groove or recess extending through the length of the socket and at one side thereof and forming a seat for a portion of the bushing F.

The felt bushing provided with glue penetrates and sets well into this recess in the socket, and the smooth round walls of the ordinary socket are thus avoided. It will be noticed that the ends *i* of the flange are bent upon each other, and, as before stated, not being cast, but being composed of metal bent or stamped into shape on a suitable machine, it is less brittle, more elastic, and less liable to break than the cast flange. Owing to the great number of such bearings employed in a piano, the saving of expense, labor, and annoying repairs obtained by this invention will be readily appreciated.

Having thus described my invention, what I claim is—

1. A piano attachment consisting of a stamped-up bearing provided with a socket for the reception of a rod, pin, or pivot, and a soft bushing and having a recess or groove specially formed in one side of said socket to hold the bushing in position, substantially as described.

2. A bearing for piano-damper and other rods provided with a socket for the reception of said rod and a bushing, and a groove or recess running through said socket for the reception of a portion of said bushing, substantially as described.

3. The stamped-up bearing having a flange D, with the ends *i* of said flange bent upon each other and also having a socket E, and a groove or recess G, extending through the length of said socket and at one side thereof to form a seat for a portion of a bushing, substantially as described.

In testimony whereof I affix my signature in presence of two witnesses.

CHARLES L. E. LUGENBUEHL.

Witnesses:
R. GEBNER,
T. BICKERT.